P. J. Schmidt,
Grain Drill.

No. 89,247. Patented Apr. 20, 1869.

Witnesses:
Wm. W. Herthel
Robert Burns

Inventor:
P. J. Schmidt
by Herthel & Co
Attys

United States Patent Office.

PETER J. SCHMITT, OF CARLINVILLE, ILLINOIS, ASSIGNOR TO SEIGEL, SCHMITT, AND COMPANY, OF SAME PLACE.

Letters Patent No. 89,247, dated April 20, 1869.

IMPROVEMENT IN GRAIN-DRILLS.

The Schedule referred to in these Letters Patent and making part of the same.

*To all whom it may concern:*

Be it known that J, PETER I. SCHMITT, of Carlinville, in the county of Macoupin, and State of Illinois, have made certain new and useful Improvements in Grain-Drills; and I do hereby declare that the following is a full and clear description thereof, reference being had to the accompanying drawings, and to the letters of reference marked thereon.

This invention relates to the machines used for planting, or drilling seed-grain, and the nature thereof, is—

First, in the method of holding down the drag-bars, and thereby, the seed-flukes, or even the flukes themselves, so that the seeds may always be deposited at proper depth in the soil.

Secondly, in the method of operating the flukes to regulate the distance between them, producing a straight or zigzag setting, in accordance with the nature of the ground, as hereinafter more fully explained.

Thirdly, in the arrangement for moving the rubber, or leather seed-tubes, which feed the grain to the flukes, so that the said tubes may not be strained or injured when the flukes are being moved to a zigzag setting.

To enable those herein skilled, to make and use my said improvements, I will now fully describe the same, referring to—

Figures 1, 6, 7:
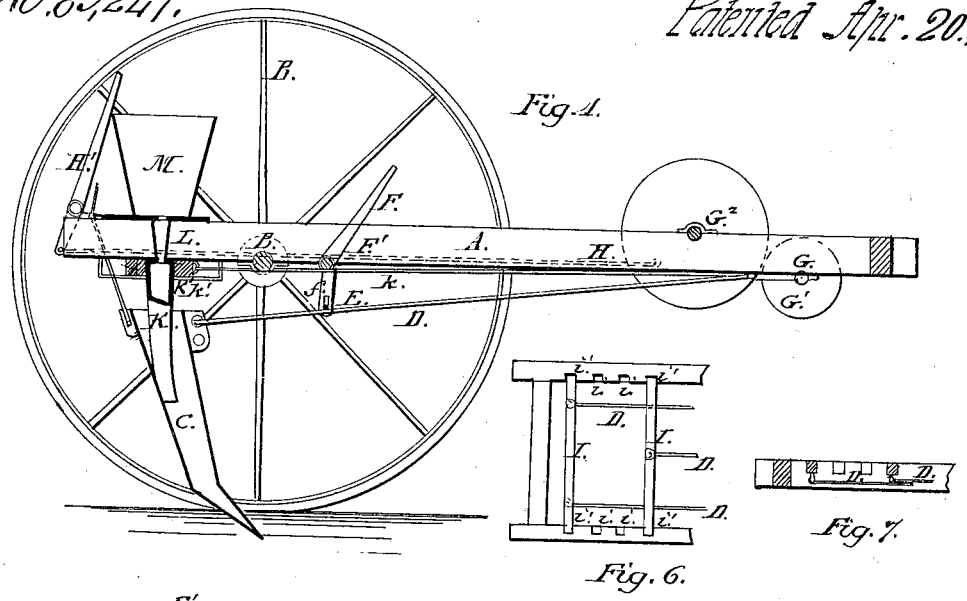
Figure 2:
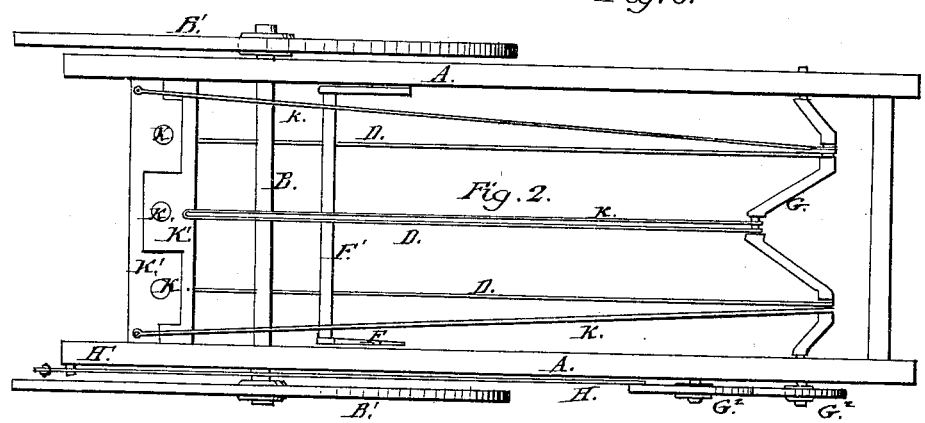
Figures 3, 4, 5:
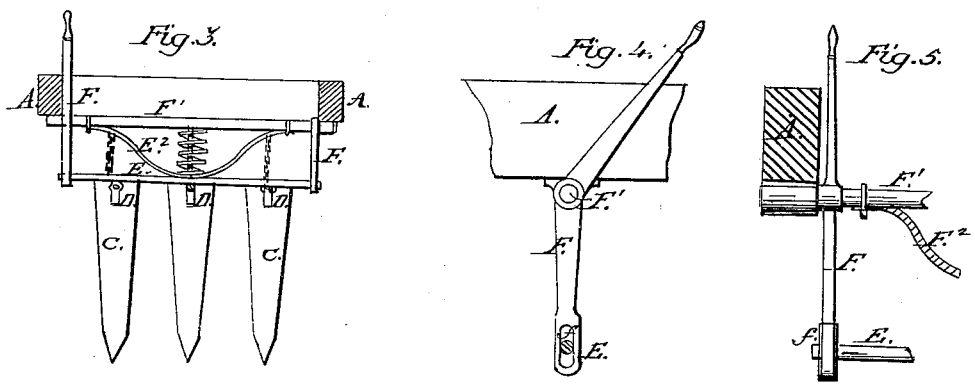

Figure 1 as a sectional elevation; to
Figure 2 as a plan;
Figure 3 as a sectional elevation; to
Figures 4 and 5, respectively, as front and side detail views; to
Figures 6 and 7 as plans and section, respectively, of a second method of operating drag-bars.

I construct the frame A of my said machine generally in the usual manner, supported upon the axle B and wheels B'.

At the rear end of said frame, I arrange the seed-flukes C, suspending the same by chains to the frame, as usually done, and connecting the same by drag-bars D, with the forward end of the frame, in a manner yet to be described.

It is well known that when the points of the flukes, or teeth C become clogged with grass or rubbish, and especially in hard soil, the said flukes will rise out of the ground, and the seed will then drop upon the surface, being, to a great extent, wasted. In order to avoid this, and to cause the flukes to penetrate and properly furrow the ground, I arrange the pressure-bar E, resting transversely across the frame A, on all drag-bars D, usually close to the flukes C.

Said bar E is guided in the levers F, which are hinged on the shaft F', which is secured, by proper bearings, to the frame A.

One or both of said levers F will pass up beyond the shaft F¹, and form a hand-lever, by means whereof, the operator will turn the said levers F, and raise the pressure-bar E from its position on the drag-bars D.

In order that a due pressure may be exerted on the bar E and drag-bars D, as here required, and, moreover, in order that said pressure may be uniform, or nearly such, whatever may be the position of the frame and its supporting-wheels, I arrange the lower ends of the levers F, slotted at *f*, and construct the spring F², which, by its ends, rests upon the shaft F¹, and is properly connected herewith, and then passes down to connect with the pressure-bar E; or said spring F² may be reversed, so that its ends connect with the bar E, and its centre connects with the shaft F¹.

It may be desirable to furthermore arrange a spiral spring centrally connecting said shaft F¹ and bar E. By all said means an elastic pressure is exerted upon the bar E, and the fluke are held in ground.

When the soil is hard, and contains large clods, or other impediments to a free movement of the flukes, it becomes advisable to increase the distance between the flukes, to afford a freer passage therefor. This I arrange by throwing each alternate fluke forward or backward, in the manner now to be described.

The drag-bars D are connected to the crank-bar G, which is journalled at its end to the main frame A, and carries the gear-wheel G¹.

In engagement with the wheel G¹ is the wheel G², secured by its shaft upon the frame A.

Said wheel G² is turned by the rod H, operated by a hand-lever, H', which will usually be arranged on the frame A', at the rear end thereof, in convenient position to the driver. The operator is, therefore, enabled to reverse the position of the crank-bar G by moving the hand-bar H', and, as is plain from fig. 2, the alternate flukes will thus be drawn forward or moved back, thus placing said flukes in a zigzag line.

In case it is inconvenient to apply the crank-bar G and its operating-devices, I arrange the shifting-bars I, supporting the forward ends of the drag-bars D, and resting, when the flukes are in a straight line, in the slots *i* of the frame A. When the flukes are to be moved to a zigzag line, the operator lifts the bars I out of the slots *i* to the slots *i'*, accomplishing the movement of the flukes as desired.

Should the tongue of the drill rest directly upon the frame A, and interfere to prevent the shifting-bars I from being easily raised, then the divisions between the slots *i* and *i'* may be made removable, and, being removed, the bars I may be slid from the one to the other required position. A readjustment, by proper set-screws, or other means, of the division-pieces between said slots will then secure the bars I in position.

In the movement of the flukes from a right line to a zigzag setting, the rubber, or leather feed-tubes being usually held fixedly at upper ends, and dropping within the flukes at lower ends, will ordinarily be cramped and injured. To avoid this, I arrange to shift the upper ends of said tubes, as in figs. 1 and 2 shown.

I connect the tubes K to the slides K', shaping said slides generally as shown in plan, fig. 2.

Said slides have the rods $k$ connecting them to the crank-bar G, or its alternative, the shifting-bar I, so that as the flukes are moved by the crank-bar, the slides K are compelled to follow.

To allow said movement, said slides will be supported on brackets $k'$, secured to the frame A.

Above said slides K, to complete the feed-device, I arrange feed-tubes L, usually of sheet-metal, hinging the same to the under side of the feed-box M, and fitted to vibrate at lower ends with the slides K.

Having thus described my invention,
What I claim, is—

1. The manner of holding the flukes in ground by elastic pressure upon the bar E, substantially as set forth.

2. Moving the flukes to a zigzag or right-line setting, by the shifting-bars I, substantially as set forth.

3. Moving the feed-tubes K by slides K' to follow the flukes, substantially as set forth.

In witness of said invention, I have hereunto set my hand, in the presence of—

PETER J. SCHMITT.

Witnesses:
GEORGE P. HERTHEL, Jr.,
WILLIAM W. HERTHEL.